(12) United States Patent
Ciaravino et al.

(10) Patent No.: US 10,428,712 B2
(45) Date of Patent: Oct. 1, 2019

(54) VARIABLE-POSITION MIXER FOR AN EXHAUST GAS AFTER-TREATMENT SYSTEM

(71) Applicant: GM GLOBAL TECHNOLOGY OPERATIONS LLC, Detroit, MI (US)

(72) Inventors: Claudio Ciaravino, Turin (IT); Andrea Arnone, Piemonte (IT)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 15/683,930

(22) Filed: Aug. 23, 2017

(65) Prior Publication Data
US 2019/0063292 A1  Feb. 28, 2019

(51) Int. Cl.
| | | |
|---|---|---|
| *F01N 3/28* | (2006.01) |
| *F01N 3/035* | (2006.01) |
| *F01N 3/08* | (2006.01) |
| *F01N 3/10* | (2006.01) |
| *F01N 3/20* | (2006.01) |
| *B01D 53/94* | (2006.01) |

(52) U.S. Cl.
CPC ......... *F01N 3/2892* (2013.01); *B01D 53/944* (2013.01); *B01D 53/9418* (2013.01); *B01D 53/9422* (2013.01); *B01D 53/9477* (2013.01); *F01N 3/035* (2013.01); *F01N 3/0842* (2013.01); *F01N 3/106* (2013.01); *F01N 3/2066* (2013.01); *B01D 2251/2067* (2013.01); *B01D 2255/904* (2013.01); *B01D 2258/012* (2013.01); *F01N 2250/02* (2013.01); *F01N 2250/12* (2013.01); *F01N 2250/14* (2013.01); *F01N 2570/14* (2013.01); *F01N 2610/02* (2013.01)

(58) Field of Classification Search
CPC ........ B01D 53/9431; B01D 2251/2067; B01D 53/9477; B01F 3/04049; B01F 5/0608; B01F 5/0616; B01F 5/0683; B01F 2005/0639; F01N 13/009; F01N 3/2066; F01N 3/2892; F01N 2240/20; F01N 2610/02; Y02A 50/2325; Y02T 10/24
See application file for complete search history.

(56) References Cited

U.S. PATENT DOCUMENTS

| 2011/0099978 A1* | 5/2011 | Davidson | F01N 3/2066 60/274 |
|---|---|---|---|
| 2013/0028805 A1* | 1/2013 | Murasaki | B01J 35/0006 422/168 |
| 2019/0040780 A1* | 2/2019 | Adelman | F01N 3/2892 |

* cited by examiner

*Primary Examiner* — Brandon D Lee
(74) *Attorney, Agent, or Firm* — Quinn IP Law

(57) ABSTRACT

An exhaust gas flow after-treatment (AT) system includes first AT device and a second AT device in fluid communication with and positioned in the flow of exhaust gas downstream of the first AT device. The AT system also includes an exhaust passage for carrying the flow of exhaust gas from the first AT device to the second AT device and an injector for introducing a reductant into the exhaust passage. The AT system additionally includes a variable-position mixer arranged within the exhaust passage downstream of the injector. Furthermore, the AT system includes a mechanism configured to regulate the variable-position mixer between and inclusive of a first mixer position configured to increase a swirling motion and turbulence in the exhaust gas flow within the exhaust passage to thereby mix the reductant with the exhaust gas flow, and a second mixer position configured to reduce a backpressure generated by the mixer.

14 Claims, 5 Drawing Sheets

VARIABLE-POSITION MIXER FOR AN EXHAUST GAS AFTER-TREATMENT SYSTEM

INTRODUCTION

The present disclosure is drawn to variable-position mixer for an exhaust gas after-treatment (AT) system employed by an internal combustion engine.

Various exhaust after-treatment (AT) devices, such as particulate filters and other devices, have been developed to effectively limit exhaust emissions from internal combustion engines. One of the exhaust after-treatment devices frequently used in a modern lean burn internal combustion engine, such as a compression-ignition or diesel type, is a selective catalytic reduction (SCR) catalyst.

The SCR is configured to convert nitrogen oxides ($NO_X$) into diatomic nitrogen ($N_2$) and water ($H_2O$) with the aid of the $NO_2$ generated by another exhaust after-treatment device, typically the diesel oxidation catalyst (DOC). For effective removal of $NO_X$, the SCR conversion process additionally requires a predetermined amount of ammonia ($NH_3$) to be present in the exhaust gas flow.

The SCR conversion process may additionally require a controlled or metered amount of a reductant having a general name of "diesel-exhaust-fluid" (DEF) into the exhaust gas flow when the reductant is employed in diesel engines. Such a reductant may be an aqueous solution of urea that includes water and ammonia.

SUMMARY

An exhaust gas flow after-treatment (AT) system includes first AT device and a second AT device in fluid communication with and positioned in the flow of exhaust gas downstream of the first AT device. The AT system also includes an exhaust passage configured to carry the flow of exhaust gas from the first AT device to the second AT device and an injector configured to introduce a reductant into the exhaust passage to thereby reduce concentration of a pollutant. The AT system additionally includes a variable-position mixer arranged within the exhaust passage downstream of the injector. Furthermore, the AT system includes a mechanism configured to regulate a position of the variable-position mixer between and inclusive of a first mixer position configured to increase, enhance, or intensify a swirling motion and turbulence in the flow of exhaust gas carried by the exhaust passage to thereby mix the introduced reductant with the flow of exhaust gas, and a second mixer position configured to reduce a backpressure generated by the mixer.

The variable-position mixer may include a plurality of pivotable louvers.

The plurality of pivotable louvers may include a first louver and a second louver. Additionally, the plurality of pivotable louvers may be synchronized such that the first louver pivots in a first direction when the second louver pivots in a second direction that is opposite to the first direction.

The first and second louvers may be set on respective first and second pivot shafts. Furthermore, each of the first and second pivot shafts may be mounted to the exhaust passage configured as a transfer pipe.

The mechanism may include a shiftable plate configured to pivot each of the first and second louvers.

The mechanism may additionally include a multiple link arrangement operatively connected to and configured to shift the plate.

The mechanism may additionally include an actuator, for example, electro-mechanical, pneumatic, or hydraulic, configured to operate the multiple link arrangement.

The AT system may also include an electronic controller configured to regulate the mechanism.

As disclosed, the internal combustion engine may be a compression-ignition engine, the reductant may be a diesel-exhaust-fluid (DEF) having an aqueous solution of urea, and the pollutant may be nitrogen oxide ($NO_X$).

The first AT device may be either a diesel oxidation catalyst (DOC) or a lean $NO_X$ trap (LNT). The second AT device may be a dual-function substrate including a selective catalytic reduction (SCR) catalyst and a diesel particulate filter (DPF).

A vehicle employing the above-described AT system is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
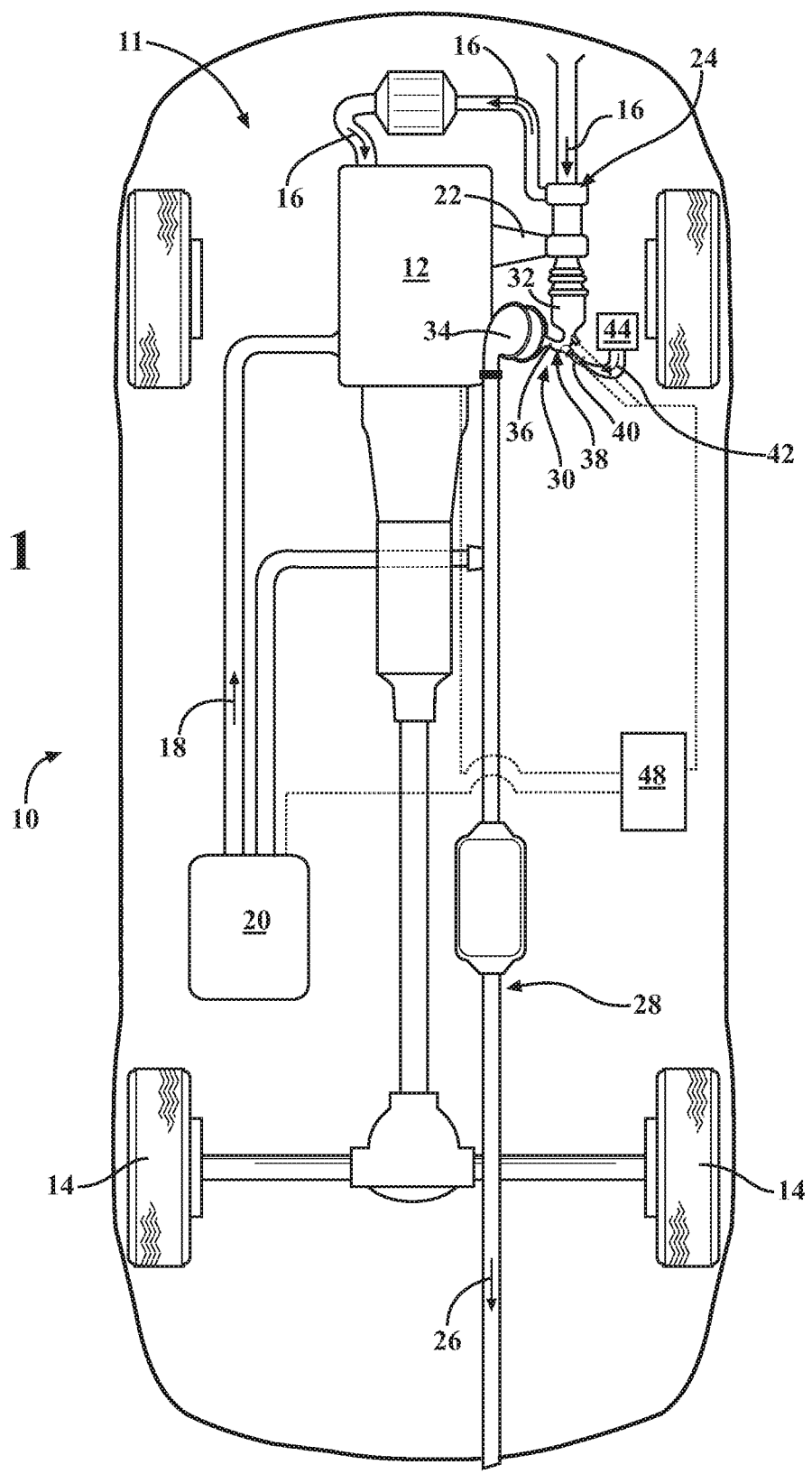
FIG. 1 is a schematic plan view of a vehicle having an internal combustion engine connected to an exhaust system having an after-treatment (AT) system with first and second close-coupled AT devices for reducing exhaust emissions.

Referring to the drawings, wherein like reference numbers refer to like components throughout the several views, FIG. 1 schematically depicts a motor vehicle 10. The vehicle 10 includes an internal combustion engine 12 configured to propel the vehicle via driven wheels 14. Although the internal combustion engine 12 may be a spark-ignition type, specific reference throughout the ensuing disclosure will be made to a compression-ignition or diesel type of an engine. As understood by those skilled in the art, internal combustion in the diesel engine 12 occurs when a specific amount of ambient air flow 16 is mixed with a metered amount of fuel 18 supplied from a fuel tank 20 and the resultant air-fuel mixture is compressed inside the engine's cylinders (not shown).

As shown, the engine 12 includes an exhaust manifold 22 and a turbocharger 24. The turbocharger 24 is energized by a flow of exhaust gas, specifically the exhaust gas flow 26 released by individual cylinders of the engine 12 through the exhaust manifold 22 following each combustion event. The turbocharger 24 is connected to an exhaust system 28 that receives exhaust gas flow 26 and eventually releases the gas flow to the ambient, typically on a side or aft of the vehicle 10. Although the engine 12 is depicted as having the exhaust manifold 22 attached to the engine structure, the engine may include exhaust passages (not shown) such as generally formed in exhaust manifolds. In such a case, the above passages may be incorporated into the engine structure, such as the engine's cylinder head(s). Furthermore, although the turbocharger 24 is shown, nothing precludes the engine 12 from being configured and operated without such a power augmentation device.

Figure 2:
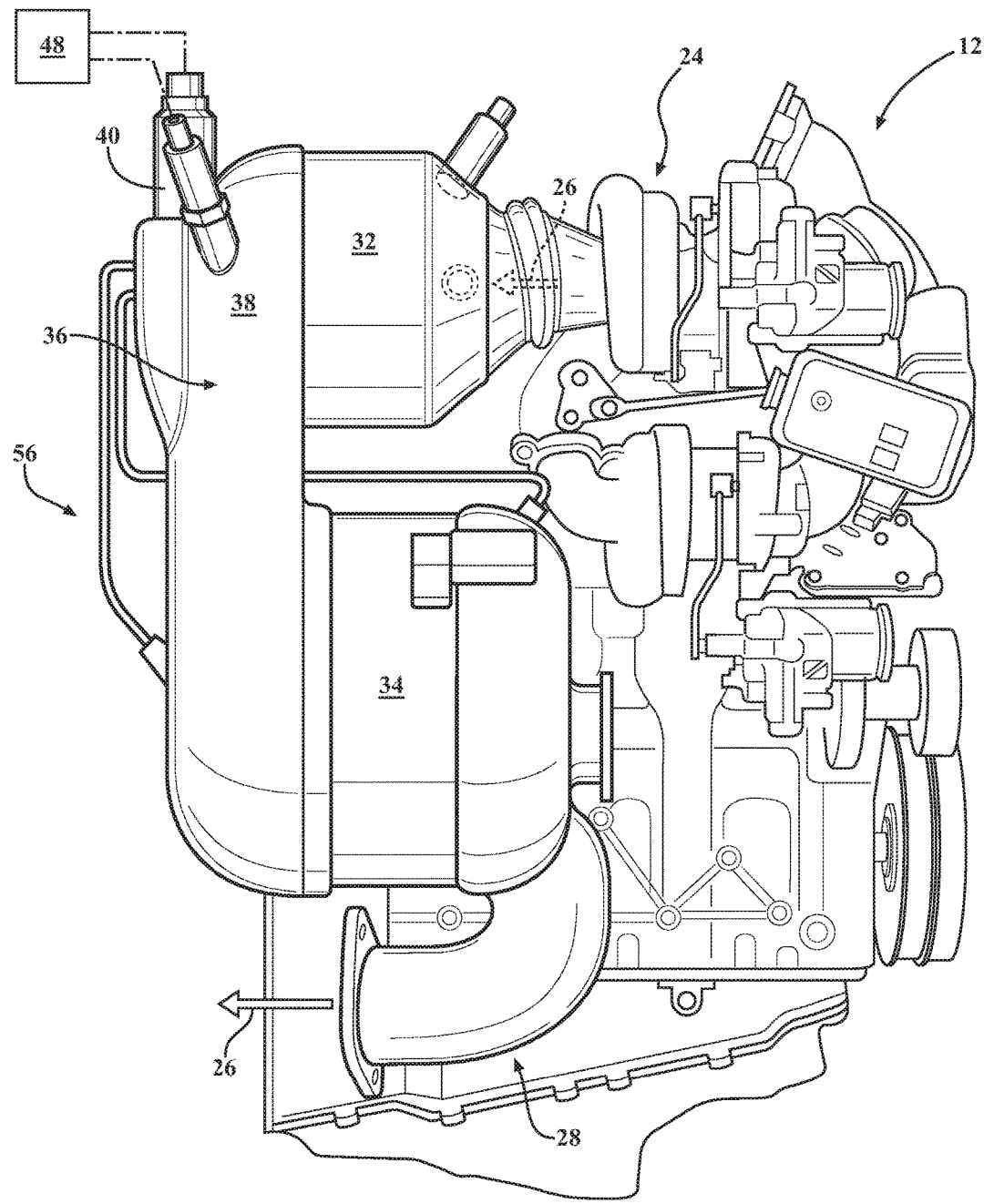
FIG. 2 is a schematic illustration of the internal combustion engine connected to the exhaust system with the after-treatment (AT) system shown in FIG. 1.

The vehicle 10 also includes an engine exhaust after-treatment (AT) system 30. The AT system 30 includes a number of exhaust after-treatment devices configured to methodically remove pollutants such as largely carbonaceous particulate byproducts and emission constituents of engine combustion from the exhaust gas flow 26. As shown in FIGS. 1 and 2, the AT system 30 operates as part of the exhaust system 28. The AT system 30 includes a first AT device 32 close-coupled to the turbocharger 24 and a second AT device 34 positioned in the exhaust gas flow 26 downstream of, in fluid communication with, and close-coupled to the first AT device. As employed herein, the term "close-coupled" with respect to the arrangement of the first and second AT devices 32, 34 denotes each of the subject devices being in close proximity to each other and arranged inside an engine compartment 11 of the vehicle 10 for close proximity to the engine 12.

The close-coupled arrangement of the first and second AT devices 32, 34 reduces length of the exhaust passage (to be described in detail below) for transferring the exhaust gas flow 26 from the first AT device 32 to the second AT device 34. Consequently, such close-coupling of the first and second AT devices 32, 34 to the engine 12 provides a compact packaging arrangement that minimizes time for activation, i.e., light-off, of the AT system 30 in after-treatment of the exhaust gas flow 26 following a cold-start of the engine 12. As shown, the first AT device 32 may be a diesel oxidation catalyst (DOC) or a lean nitrogen oxide ($NO_X$) trap (LNT), while the second AT device 34 may be a dual-function substrate including a selective catalytic reduction (SCR) catalyst or an SCR on filter (SCRF) and a diesel particulate filter (DPF).

The primary function of the DOC is reduction of carbon monoxides (CO) and non-methane hydrocarbons (NMHC). When present, the DOC is additionally configured to generate nitrogen dioxide ($NO_2$), which may be used by the SCR arranged remotely downstream of the DOC and described in greater detail below. The DOC typically contains a catalyst substance made up of precious metals, such as platinum and/or palladium, which function therein to accomplish the above-noted objectives. Generally, with respect to generation of $NO_2$, the DOC becomes activated and reaches operating efficiency at elevated temperatures. Therefore, as shown in FIGS. 1 and 2, the DOC may be close-coupled to the turbocharger 24 in order to reduce loss of thermal energy from the exhaust gas flow 26 prior to the gas reaching the DOC.

The primary function of the LNT is to reduce oxides of nitrogen or $NO_X$ that are emitted by the engine 12 in the exhaust gas flow 26 as a byproduct of the reaction of nitrogen and oxygen gases in the air following a combustion event. The LNT removes $NO_X$ molecules from the exhaust gas flow 26 by adsorption, i.e., trapping and storing them internally during operation of the engine 12, thus acting like a molecular sponge. Typically, the LNT includes a ceramic substrate structure with a catalyzed wash-coat, i.e., mixed with an active precious metal, that is applied to channels of the substrate.

The primary function of the SCR is to convert nitrogen oxides ($NO_X$) into diatomic nitrogen ($N_2$) and water ($H_2O$), for example, with the aid of the $NO_2$ generated by the first AT device 32 configured as the DOC. The SCR may be configured as a 1-way filter, which filters particulate matter or soot, or a 2-way filter, which includes a catalyzed wash-coat, and carries two functions—filters particulate matter and reduces $NO_X$. For effective removal of $NO_X$, the SCR conversion process additionally requires a predetermined amount of ammonia ($NH_3$) to be present in the fuel-rich exhaust gas flow 26.

The primary function of the DPF is to collect and dispose of particulate matter emitted by the engine 12. The DPF acts as a trap for removing the particulate matter, specifically, soot, from the exhaust flow 26. Similar to the DOC described above, the DPF may contain precious metals, such as platinum and/or palladium, which would function as a catalyst to accomplish the noted objective. When used with an SCRF, however, such precious metals in the DPF could be removed.

As shown, the DOC or the LNT first AT device 32 is positioned upstream of the second AT device 34 including the SCR and DPF. The AT system 30 also includes an exhaust passage 36 configured to transfer or carry the flow of exhaust gas 26 from the first AT device 32 to the second AT device 34. The exhaust passage 36 may be defined by a transfer pipe 38 fluidly connecting the first and second AT devices 32, 34. As shown, the exhaust passage 36 is arranged along an axis Y, and the flow of exhaust gas 26 proceeds along the axis Y. As part of the AT system 30, an injector 40 is arranged downstream of the first AT device 32. The injector 40 is configured to generate a spray of a reductant 42 containing ammonia ($NH_3$), such as an aqueous solution of urea, a.k.a., diesel-exhaust-fluid (DEF), and introduce the reductant into the exhaust passage 36 for reducing via the second AT device 34 concentration of a particular pollutant, such as $NO_X$. As shown in FIG. 1, the injector 40 may receive the reductant 42 from a refillable reservoir 44.

The second AT device 34 is most effective in treating the flow of exhaust gas 26 when the flow of exhaust gas and the reductant 42 entering the second AT device substrate is a relatively homogenous mixture. Additionally, an induced swirling motion in the flow of the exhaust gas flow 26 containing the reductant may generate a more thorough coverage of the inlet to the second AT device 34, thus facilitating a more rapid light-off during cold-start of the engine 12 and a generally more efficient operation of the second AT device, and the AT system 30 overall.

The AT system 30 also includes a controller 48. The controller 48 may be a stand-alone unit, or be part of an electronic control unit (ECU) that regulates the operation of engine 12. The controller 48 is arranged on the vehicle 10 and includes a processor and a readily accessible non-transitory memory. Instructions for controlling operation of the AT system 30 are programmed or recorded in the memory of the controller 48 and the processor is configured to execute the instructions from the memory during operation of the vehicle 10. The controller 48 is generally programmed to regulate the injector 40 for introducing the reductant 42 into the exhaust passage 36 during operation of the engine 12 to thereby reduce concentration of the specific pollutant.

Figure 3:
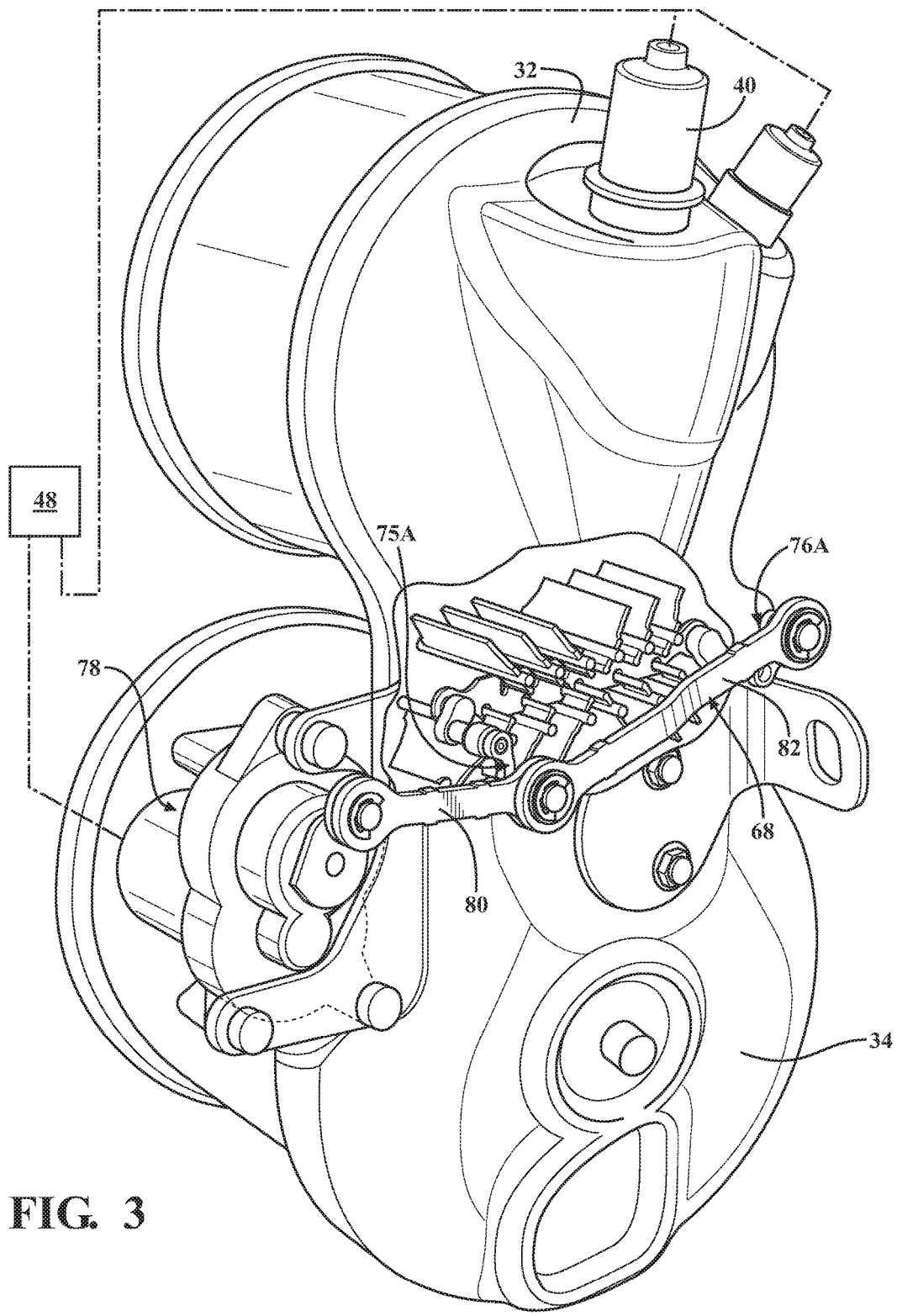
FIG. 3 is a schematic perspective partial cut-away view of the AT system shown in FIG. 1, illustrating a variable-position mixer arranged between the first and AT devices.
Figure 4:
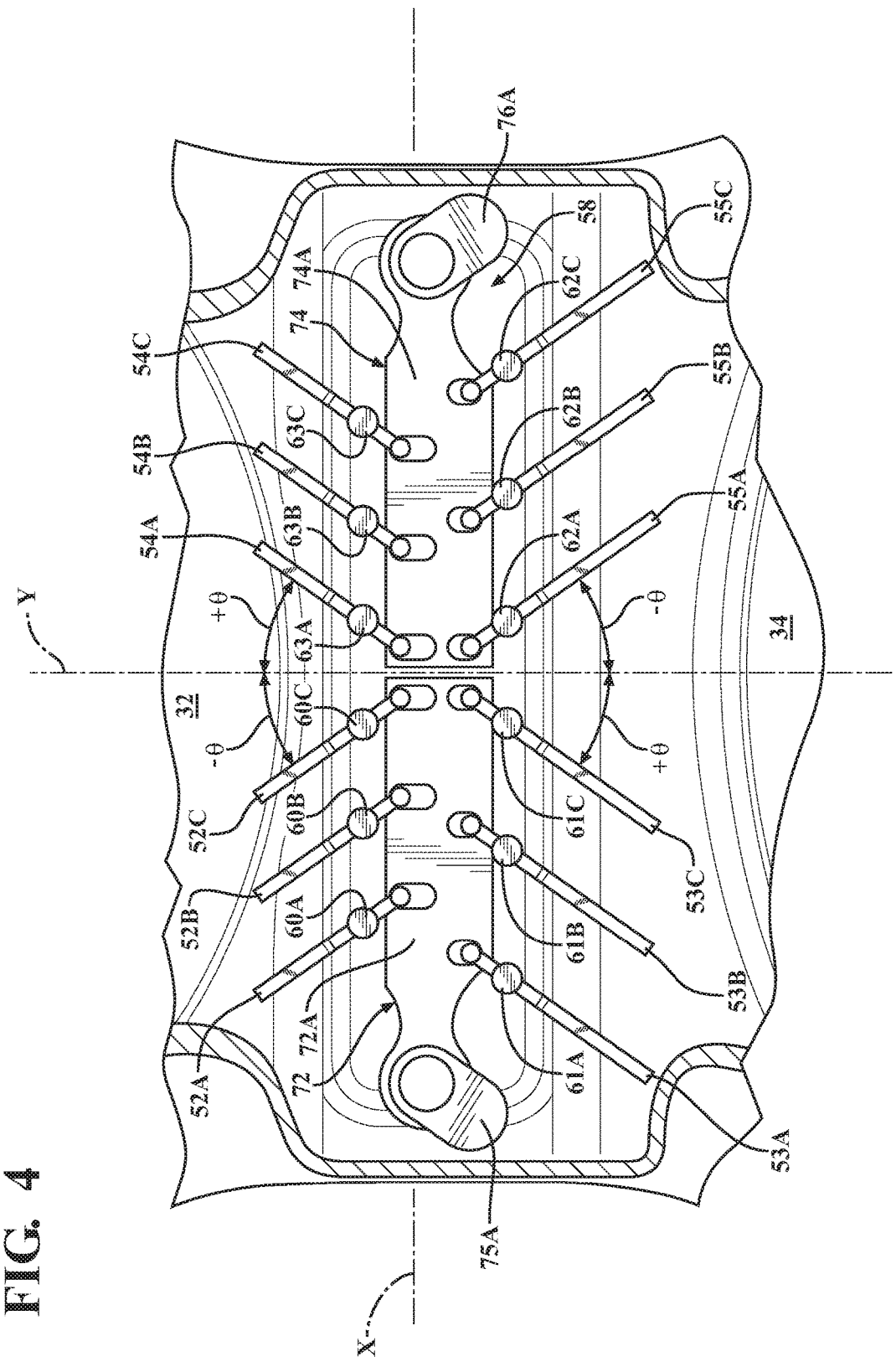
FIG. 4 is a schematic perspective partial cut-away view of the AT system shown in FIG. 1, illustrating the variable-position mixer set to deflect a flow of exhaust gas with an injected reductant for generating swirl therein.
Figure 5:
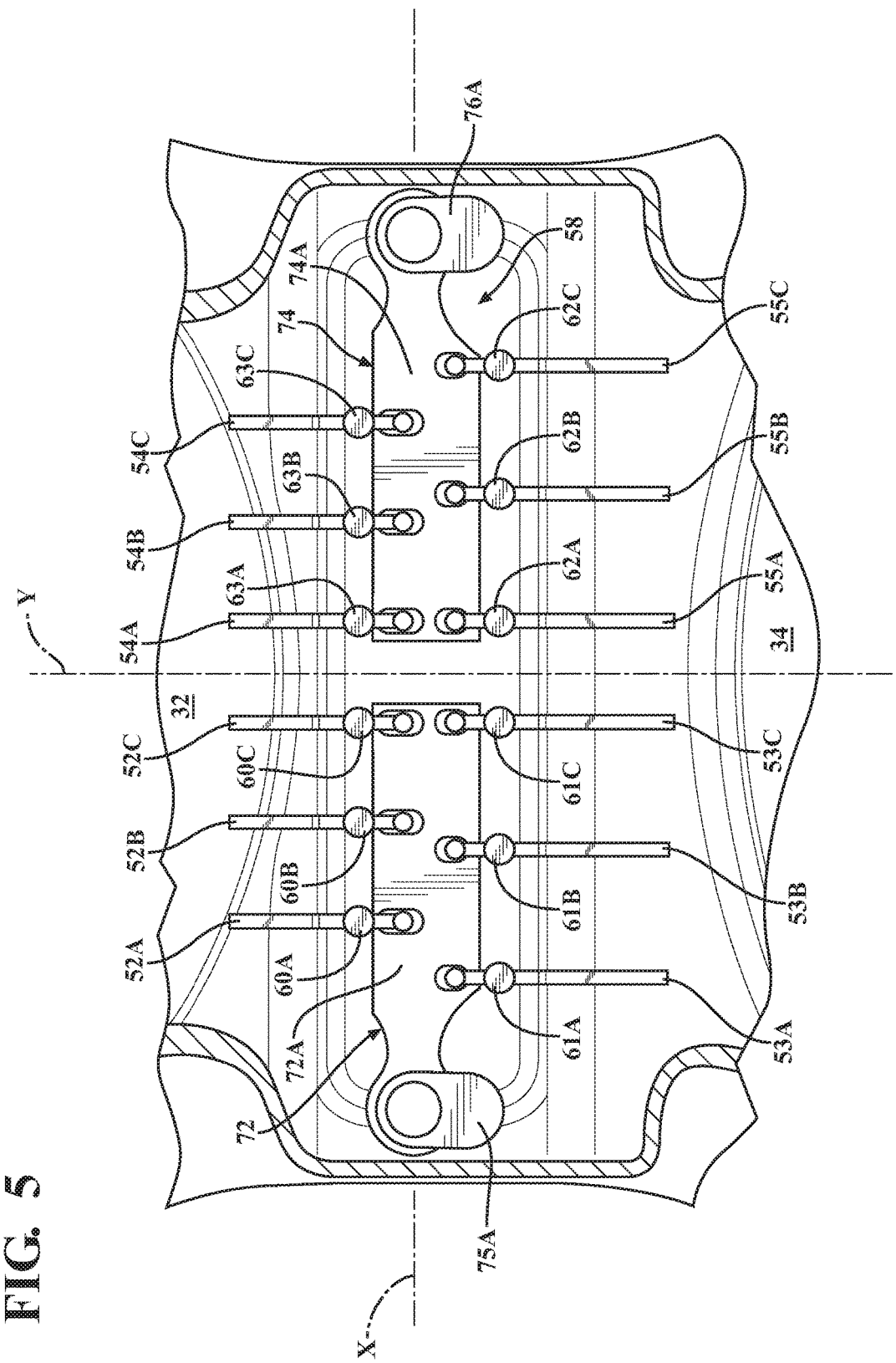
FIG. 5 is a schematic perspective partial cut-away view of the AT system shown in FIG. 1, illustrating the variable-position mixer set to permit a direct pass-thorough for the flow of exhaust gas with an injected reductant.

As shown in FIGS. 3-5, a variable-position mixer 50 is arranged within the exhaust passage 36 downstream of the injector 40 and upstream of the sensor second AT device 34. As shown, the variable-position mixer 50 may include a plurality of moveable louvers or vanes, herein shown as having three upstream individual louver elements 52A, 52B, 52C and three downstream individual louver elements 53A, 53B, 53C in a first louver set 56, and three opposing upstream individual louver elements 54A, 54B, 54C and three downstream individual louver elements 55A, 55B, 55C in a second louver set 58, but the number of louvers in each of the first and second louver sets may either be fewer or greater. Also as shown, the louver elements 52A, 52B, 52C, 53A, 53B, 53C, 54A, 54B, 54C, 55A, 55B, and 55C are pivotably mounted to the transfer pipe 38 between the first AT device 32 and the second AT device 34 via respective pivot shaft elements 60A, 60B, 60C, 61A, 61B, 61C, 62A, 62B, 62C, 63A, 63B, and 63C. Accordingly, the pivot shafts 60A, 60B, 60C, 61A, 61B, 61C, 62A, 62B, 62C, 63A, 63B, and 63C define respective pivot axes of the individual louvers 52A, 52B, 52C, 53A, 53B, 53C, 54A, 54B, 54C, 55A, 55B, and 55C relative to the exhaust passage 36.

The variable-position mixer 50 is configured to operate through a rotational range 66, which may be defined as an included angle between +θ and −θ with respect to the axis Y of the exhaust passage 36 (shown in FIGS. 3-5). When the louver elements of the first and second louver set 58A, 58B are in their respective direct pass-through positions (shown in FIG. 5), where included angle θ for each louver set is substantially zero, the flow of exhaust gas 26 penetrates the plane of the variable-position mixer 50 relatively undisturbed and continues on as such to the second AT device 34. In other words, the direct pass-through positions of the respective first and second louver set 56, 58 permits laminar flow of exhaust gas 26 within the exhaust passage 36.

On the other hand, when the louver elements of the first and second louver set 56, 58 are in their respective swirl positions (shown in FIG. 3-4), where included angle θ for each set is greater than zero, the flow of exhaust gas 26 is deflected by the variable-position mixer 50, such that turbulence and swirl are increased, enhanced, or intensified in the gas flow that enters the second AT device 34. Furthermore, as shown in FIG. 4, the subject plurality of pivotable louvers may be synchronized such that the first set of louvers 56 pivots in a first direction (for example where the included angle for louvers 52A, 52B, 52C is −θ, and the included angle for louvers 53A, 53B, 53C is +θ), when the second set of louvers 58 pivots in a second direction that is opposite to the first direction (where, in the same example, the included angle for louvers 54A, 54B, 54C is +θ, and the included angle for louvers 55A, 55B, and 55C is −θ). The first and second louver sets 56, 58 thereby effectively control pass-through and smoothness of the flow of exhaust gas 26 within the exhaust passage 36.

The variable-position mixer 50 also includes a mechanism 68 configured to regulate a position of the variable-position mixer 50 between and inclusive of a first mixer position and a second mixer position, i.e., between and inclusive of the +θ and −θ included angle. The first mixer position shown in FIGS. 3-4 is a specific position wherein the included angle θ is at some specific value, approaching either +θ or −θ, as discussed above, and is configured to facilitate and maximize, i.e., increase, enhance, or intensify, a swirling motion and turbulence in the flow of exhaust gas 26 carried by the exhaust passage 36 serving to mix the introduced reductant 42 with the flow of exhaust gas. The second mixer position shown in FIG. 5 is a specific position wherein the included angle θ is substantially equal to zero, as also discussed above, and is configured to reduce or minimize a backpressure generated by the variable-position mixer 50. In the second mixer position, the backpressure generated by the variable-position mixer 50 approaches that of the passage 36 configured without a mixer. As a result, the mechanism 68 is configured to select between generation of a predetermined degree of swirling motion and turbulence in the flow of exhaust gas 26 carried by the exhaust passage 36, and reduction of backpressure generated by the variable-position mixer 50.

Specifically, the mechanism 68 is configured to shift the louvers of the first and second louver set 56, 58 relative to the axis Y, to thereby select and lock a desired position for the variable-position mixer along the above described range of rotation 66. In the depicted embodiment, the mechanism 68 is configured to cause the louvers of the first louver set 56 to rotate in tandem, i.e., substantially in unison, into select available positions. Simultaneously, the mechanism 68 is configured to cause the louvers of the second louver set 58 to rotate in tandem in an opposite direction of the one selected for the first set 56, as described above. The mechanism 66 may be configured to select and lock discrete intermediate position(s) of the louvers of each of the first and second louver set 56, 58, or to infinitely vary position of the subject louvers across the range of rotation 66, i.e., between the included angle +θ and the included angle −θ with respect to the axis Y.

The mechanism 68 may include a first shiftable plate 72 configured to pivot the first louver set 56 via a first set of connection points 72A and a second shiftable plate 74 configured to pivot the second louver set 58 via a second set of connection points 74A. Additionally, the mechanism 68 may include a multiple link arrangement 76 operatively connected to and configured to shift the first plate 72 and the second plate 74. As shown, the multiple link arrangement 76 includes a first link 75A configured to shift the plate 72 along an axis Y that is transverse with respect to the axis Y, and a second link 76A configured to shift the plate 74 along the axis X.

The mechanism 68 may additionally include an actuator 78 configured to operate the multiple link arrangement 76 and thereby select a desired position for the variable-position mixer 50. The actuator 78 may be electro-mechanical, such as an electric motor shown in FIG. 3, pneumatic, or hydraulic. As shown, the actuator 78 may be connected to the first link 75A via a lever arm 80 and to the second link 76A via a lever arm 82 to affect the desired movement of the first set 56 in the opposite direction of the second set of louvers 58. The controller 48 may be programmed to regulate the mechanism 68 in response to specific operating conditions of the engine 12, such as commanding the mechanism to rotate the louvers of the second louver set 58 in an opposite direction of the direction selected for the first set 56, as described above, when swirling motion of the exhaust gas flow 26 containing the reductant 42 is most beneficial.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An after-treatment (AT) system for a flow of exhaust gas from an internal combustion engine, the AT system comprising:
   a first AT device;
   a second AT device in fluid communication with and positioned in the flow of exhaust gas downstream of the first AT device and configured to reduce concentration of a pollutant;
   an exhaust passage configured to carry the flow of exhaust gas from the first AT device to the second AT device;
   an injector configured to introduce a reductant into the exhaust passage;
   a variable-position mixer arranged within the exhaust passage downstream of the injector and includes a plurality of pivotable louvers having a first louver and a second louver synchronized such that the first louver pivots in a first direction when the second louver pivots in a second direction that is opposite to the first direction; and
   a mechanism configured to regulate a position of the variable-position mixer between and inclusive of a first mixer position configured to increase a swirling motion and turbulence in the flow of exhaust gas carried by the exhaust passage to thereby mix the introduced reductant with the flow of exhaust gas, and a second mixer position configured to reduce a backpressure generated by the mixer, wherein the mechanism includes a shiftable plate configured to pivot, in tandem, the first louver in the first direction and the second louver in the second direction.

2. The AT system of claim 1, wherein the first and second louvers are set on respective first and second pivot shafts, and wherein each of the first and second pivot shafts is mounted to the exhaust passage.

3. The AT system of claim 1, wherein the mechanism additionally includes a multiple link arrangement operatively connected to and configured to shift the plate.

4. The AT system of claim 3, wherein the mechanism additionally includes an actuator configured to operate the multiple link arrangement.

5. The AT system of claim 1, further comprising an electronic controller configured to regulate the mechanism.

6. The AT system of claim 1, wherein:
   the internal combustion engine is a compression-ignition engine;
   the reductant is a diesel-exhaust-fluid (DEF) having an aqueous solution of urea; and
   the pollutant is nitrogen oxide ($NO_x$).

7. The AT system of claim 6, wherein:
   the first AT device is one of a diesel oxidation catalyst (DOC) and a lean $NO_x$ trap (LNT); and
   the second AT device is a dual-function substrate including a selective catalytic reduction (SCR) catalyst and a diesel particulate filter (DPF).

8. A vehicle comprising:
   an internal combustion engine configured to generate a flow of exhaust gas as a byproduct of generating power; and
   an exhaust system connected to the engine and having an after-treatment (AT) system for the flow of exhaust gas, the AT system including:
   a first AT device;
   a second AT device in fluid communication with and positioned in the flow of exhaust gas downstream of the first AT device and configured to reduce concentration of a pollutant;
   an exhaust passage configured to carry the flow of exhaust gas from the first AT device to the second AT device;
   an injector configured to introduce a reductant into the exhaust passage;
   a variable-position mixer arranged within the exhaust passage downstream of the injector and having a plurality of pivotable louvers having a first louver and a second louver synchronized such that the first louver pivots in a first direction when the second louver pivots in a second direction that is opposite to the first direction; and
   a mechanism configured to regulate a position of the variable-position mixer between and inclusive of a first mixer position configured to increase a swirling motion and turbulence in the flow of exhaust gas carried by the exhaust passage to thereby mix the introduced reductant with the flow of exhaust gas, and a second mixer position configured to reduce a backpressure generated by the mixer, wherein the mechanism includes a shiftable plate configured to pivot, in tandem, the first louver in the first direction and the second louver in the second direction.

9. The vehicle of claim 8, wherein the first and second louvers are set on respective first and second pivot shafts, and wherein each of the first and second pivot shafts is mounted to the exhaust passage.

10. The vehicle of claim 8, wherein the mechanism additionally includes a multiple link arrangement operatively connected to and configured to shift the plate.

11. The vehicle of claim 10, wherein the mechanism additionally includes an actuator configured to operate the multiple link arrangement.

12. The vehicle of claim 8, further comprising an electronic controller configured to regulate the mechanism.

13. The vehicle of claim 8, wherein:
   the internal combustion engine is a compression-ignition engine;
   the reductant is a diesel-exhaust-fluid (DEF) having an aqueous solution of urea; and
   the pollutant is nitrogen oxide ($NO_x$).

14. The vehicle of claim 13, wherein:
   the first AT device is one of a diesel oxidation catalyst (DOC) and a lean $NO_x$ trap (LNT); and
   the second AT device is a dual-function substrate including a selective catalytic reduction (SCR) catalyst and a diesel particulate filter (DPF).

* * * * *